United States Patent [19]

Blanchard et al.

[11] Patent Number: 4,826,185

[45] Date of Patent: May 2, 1989

[54] SNOWMOBILE SKI SUSPENSION STRUT

[75] Inventors: Yves Blanchard, Valcourt; Lionel Talbot, St-Colombin, both of Canada

[73] Assignee: Bombardier Inc., Canada

[21] Appl. No.: 114,511

[22] Filed: Oct. 30, 1987

[51] Int. Cl.$^4$ .............................................. B62B 13/08
[52] U.S. Cl. .................................. 280/21.1; 280/668; 267/221
[58] Field of Search .................... 280/25, 21 R, 21 A, 280/673, 668, 666; 267/221

[56] References Cited

U.S. PATENT DOCUMENTS 3,931,862  1/1976  Cote ...................................... 280/25
4,143,729  3/1979  West et al. ........................ 280/21 R Primary Examiner—John A. Pekar
Attorney, Agent, or Firm—Larson and Taylor

[57] ABSTRACT

A ski suspension strut for a snowmobile comprises: upper and lower telescopically arranged members guided for a predetermined range of relative axial movement but constrained against relative rotation. The lower member is of cylindrical profile and is rotatably supported in a fixed generally upright orientation by mounting means in the snowmobile. One end of the lower member is connected to a snowmobile ski and the second member is connected to a steering mechanism in the snowmobile to be rotated thereby in effecting steering movement of the ski. Damper means is located interiorly of the lower member and operatively connected to both members to dampen relative axial movement thereof. Linear bearing means are mounted in the lower member in sliding engagement with a section of the upper member that is of constant square profile over a suitable length.

6 Claims, 4 Drawing Sheets

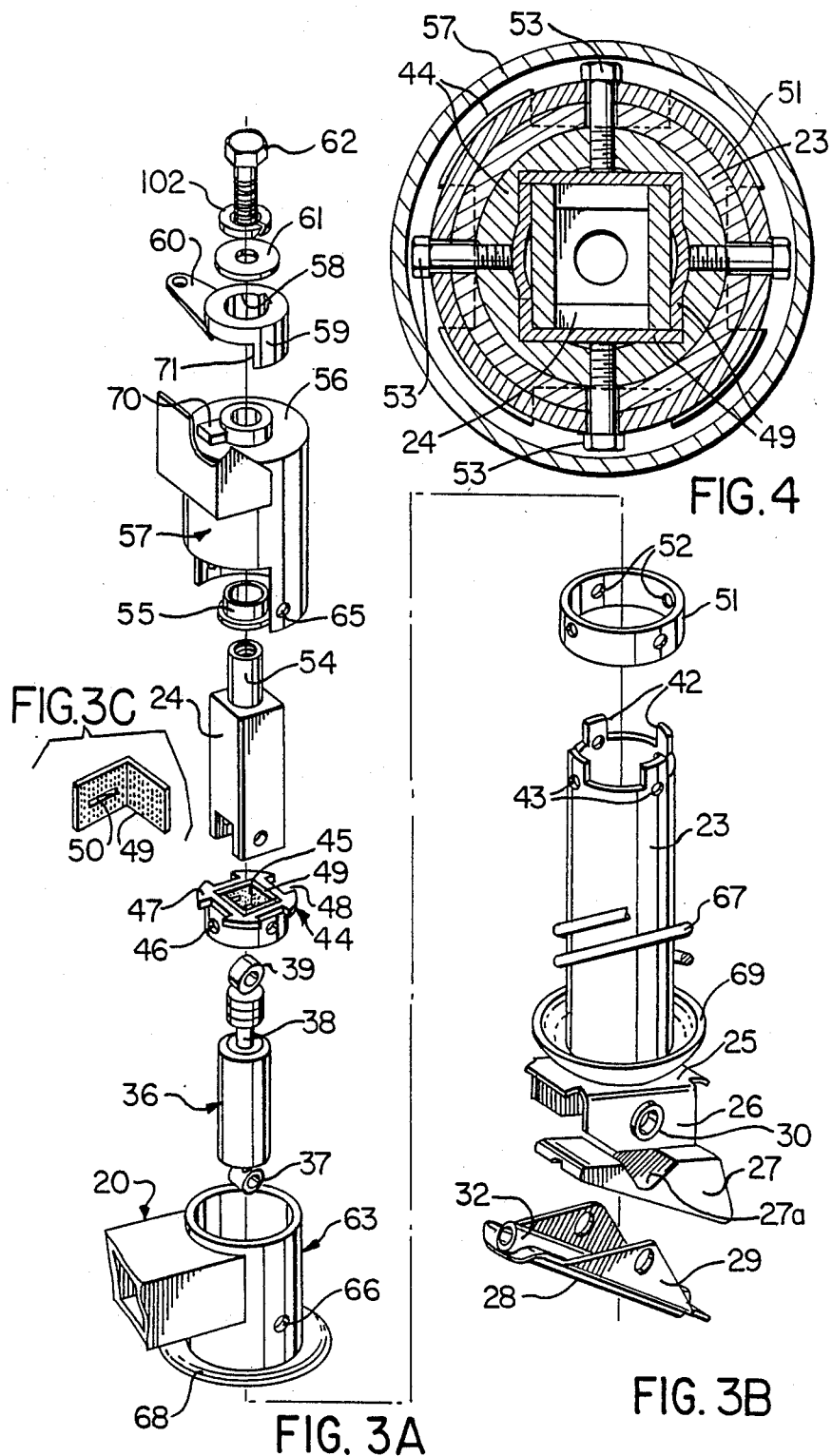

SNOWMOBILE SKI SUSPENSION STRUT

FIELD OF THE INVENTION

The present invention relates to improvements in snowmobile ski suspensions, and in particular to an improved telescopic ski suspension strut and to a snowmobile incorporating such a strut.

DESCRIPTION OF THE PRIOR ART

The most common form of ski suspension hitherto employed in snowmobiles utilizes a bowed leaf spring interposed between the lower end of the steerable ski leg and the ski. Often a hydraulic shock absorber has been connected adjacent to the leaf spring to dampen the spring motion. However because of the geometry of this configuration it has not been possible to make most effective use of the shock absorber. Furthermore, the range of suspension spring travel available from the conventional leaf spring suspension has been limited to about 3 to 4 inches. Because of these limitations, there have been numerous attempts in recent years to devise snowmobile ski suspensions having improved performance characteristics.

One such modified suspension system is disclosed in U.S. Pat. No. 3,931,862 dated Jan. 13, 1976 Yvon Cote assigned to the assignee to the present application. The Côté ski suspension proposed the use of a telescopic strut having telescoping members of square configuration positioned around an axially extending hydraulic damper and spring arrangement. While the Côté ski suspension afforded significant advantages in terms of comfort and performance as compared with prior art suspensions, it did not find favour commercially, due to the expense of its construction.

Other telescoping strut ski suspensions are disclosed in U.S. Pat. No. 4,443,856 Yoshida and in Canadian Pat. Nos. 1,162,217 Deere & Company and 1,015,384 Monroe Auto Equipment Company.

SUMMARY OF THE INVENTION

The present invention provides a ski suspension strut for a snowmobile, comprising: first and second telescopically arranged members and guide means for guiding said members for a predetermined range of relative axial movement and constraining them against relative rotation; one end of said first member being adapted to be connected to a snowmobile ski and the second member being adapted for connection to a steering mechanism in said snowmobile to be rotated thereby in effecting steering movement of said ski; damper means being located interiorly of one said member and operatively connected to both said members to dampen relative axial movement thereof; wherein said guide means comprises linear bearing means mounted in said one member and in sliding engagement with a section of said other member that is of constant non-circular profile over a length that corresponds to said predetermined range; said one member being of cylindrical profile and being adapted to be rotatably supported in a fixed generally upright orientation by mounting means formed by a bearing structure in said snowmobile.

Preferably the lowermost of the two tubular members is a cylindrical tube having a mounting bracket at its lower end for pivotal attachment to the snowmobile ski. The upper end of the cylindrical member forms a journal for pivotal mounting of the strut in a tubular bearing in the snowmobile frame. This upper end also preferably carries fixed thereto the linear bearing means which is in sliding engagement with a second telescopic member in the form of a square shaft the lower end of which is attached to a hydraulic damper that is mounted within the lower tubular telescopic member. The square shaft is preferably enclosed within a tubular hood adapted to be fixedly secured to the snowmobile and forming a pivot bearing at its upper end receiving a cylindrical section formed in the end of the square shaft to which is attached a radially projecting steering arm.

The upright mounting orientation of the suspension strut preferably includes a slight rearwards inclination (of up to about 30°) so that during the suspension movements, the snowmobile ski will deflect both upwardly and slightly rearwardly.

DESCRIPTION OF THE DRAWINGS

The invention will further be described, by way of example only, with reference to the accompanying drawings wherein:

FIGS. 3A and 3B together constitute an exploded perspective view showing the major components of the suspension strut of FIGS. 1 and 2;

FIG. 3C is an enlargement of a detail of FIG. 3A.

FIG. 4 is a partial sectional view taken on the line IV—IV in FIG. 2; and

DETAILED DESCRIPTION OF THE PREFERRED EMBODIMENT

Figure 1:
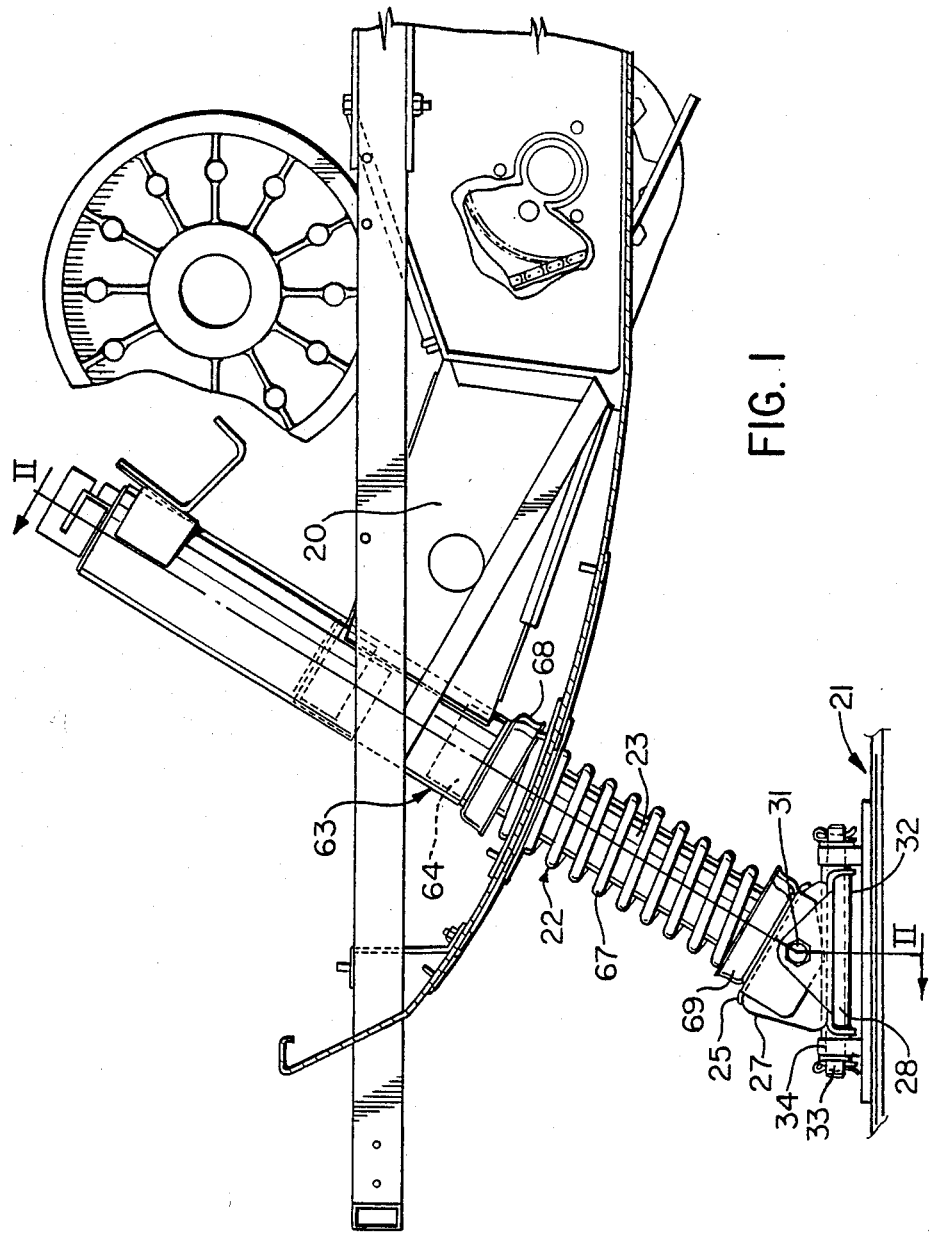
FIG. 1 is a fragmentary partially sectioned side elevation view of a preferred embodiment of a suspension strut incorporated in a snowmobile.

Referring to FIG. 1, the front end of a snowmobile frame 20 is supported on a single centrally mounted ski 21 by a suspension strut assembly 22 arranged therein in a fixed generally upright orientation with a slight rearwards inclination.

Figure 2:
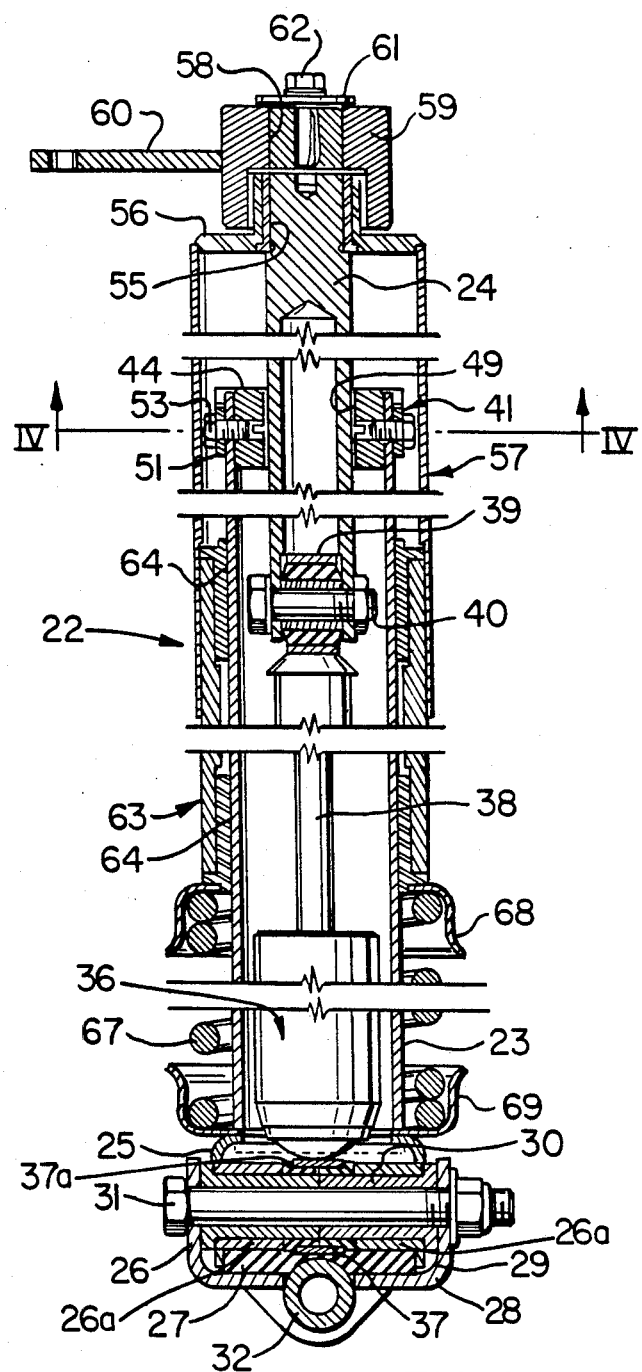
FIG. 2 is an enlarged sectional view taken on the line II—II in FIG. 1.
Figure 5:
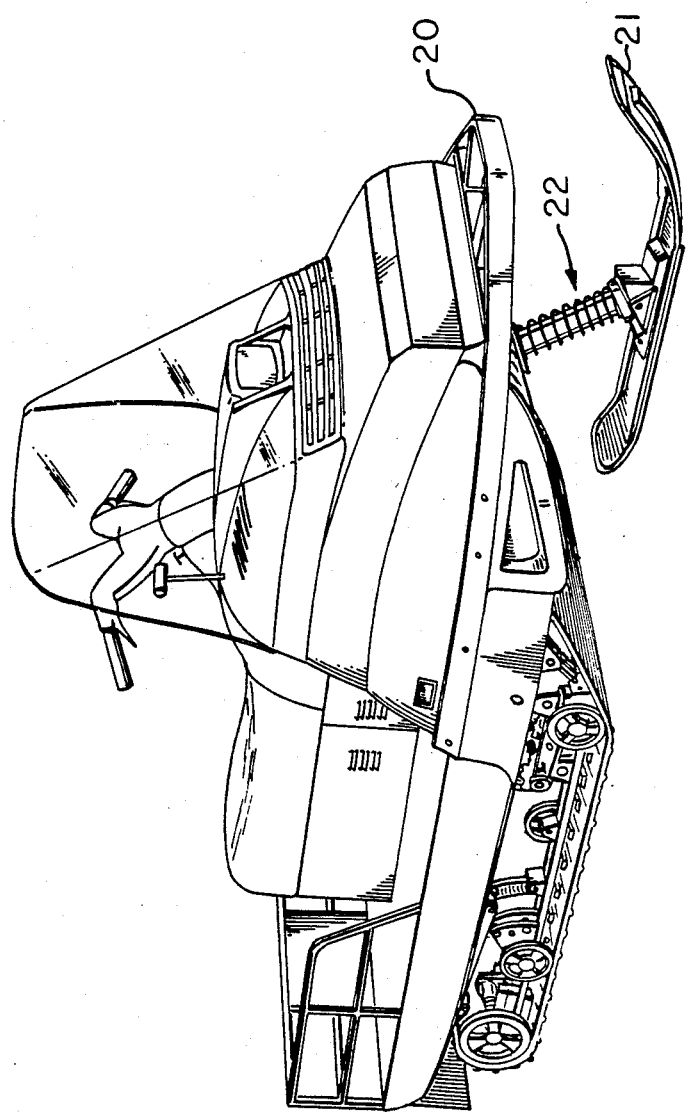
FIG. 5 is a front prespective view of the snowmobile.

As is more clearly shown in FIGS. 2 and 3A and 3B, the suspension strut assembly 22 includes an outer tubular telescopic member or ski leg 23 and an inner square-sectioned telescopic member or square shaft 24. The lower end of the outer member is integral with a metal bracket 25 of inverted U-shape having depending limbs 26 which embrace a wedge-shaped pad 27 of resilient material. A pair or co-axial steel bushings 26a are welded to the limbs 26 of the bracket 25 and are received in a groove 27a on the top of the pad 27. On its underside the pad 27 rests upon a U-shaped ski attachment bracket 28 having upstanding limbs 29. As seen in FIG. 2 a bushing arrangement 30 is carried by a bolt 31 received through aligned apertures in the limbs of the brackets 25 and 28 and forming a pivotal attachment therebetween. It will be appreciated that the bracket 28 can undergo a limited degree of movement about the axis of the bolt 31, such movement being resisted by compression of the resilient pad 27.

The ski attachment bracket 28 includes an integral bearing tube 32 extending longitudinally thereof at right angles to the axis of the bolt 31. As seen in FIG. 1, a clevis pin 33 passes through aligned bushings of a mounting bracket 34 fixed to the ski, and also through the bearing tube 32 thus forming a pivotal attachment between the ski and the suspension strut assembly, on an axis parallel to the length of the ski.

Arranged co-axially within the outer tubular member 23 of the suspension strut is a hydraulic damper assembly 36. The lower end of the cylinder of the damper assembly has an integral eye 37 which is fixed by the bolt 31 passing through the bearing arrangement 30, and is thereby rigidly attached with respect to the outer tubular member 23. A pair of nylon bushings 37a are carried within the eye 37. The damper includes an upwardly projecting cylindrical piston rod 38 which terminates in an eye 39 attached by a suitable fastener arrangement 40 to the lower end of the inner square member 24 of the strut.

As noted above, the inner square strut member 24 is co-axial with respect to the outer member 23, and can move axially with respect thereto upon extension or retraction of the hydraulic damper 36. Such axial movement is guided by a linear bearing assembly 41 carried at the upper end of the outer member 23, and explained more fully in relation to FIGS. 3A and 3B and 4.

As seen in FIG. 3B, the upper end of the outer tubular member 23 contains four equiangularly spaced axially projecting lugs 42 in each of which is formed a radial bore 43. A housing 44 has a large square section opening 45 extending axially therethrough. The outer wall of the housing 44 is cylindrical, and is formed with four equiangularly spaced screw-threaded radial bores 46 extending therethrough. The upper end of the housing 44 is formed with an annular flange 47 in which are defined four recesses 48, each aligned with one side of the square opening 45.

Within the square opening 45 are received two L-shaped bearing elements 49 of a suitable low-friction material, each of which is formed with an outwardly projecting arcuate detent 50 on its rear surface received in a complimentary recess 50a (See FIG. 3C and FIG. 4) in the square opening 45 to locate the bearing elements 49 therein in sliding engagement with the confronting surfaces of the square strut member 24. The recesses 50a intersect the radial bores 46 and are or arcuate slot-shaped form.

A short tubular attachment ring 51 is formed with four equiangularly spaced radial bores 52 and has an internal diameter corresponding to the outer diameter of the outer telescopic strut member 23. In the assembled condition shown in FIG. 2 the housing 44 is positioned on top of the telescopic member 23 with the lugs 42 received in the recesses 48, and is secured in position by cap screws 53 inserted through the aligned bores 52 and 43, and threadly engaging in the bores 46 of the housing.

The upper end of the square strut member 24 is formed with a cylindrical extension 54 which passes through a tubular bearing sleeve 55 that is supported in the closed top section 56 of a closed tubular hood 57. The cylindrical extension 54 of the square strut member 24 projects beyond the top section 56 and is received within and keyed to a bore 58 in a tubular hub 59 of a radially projecting steering lever 60, the hub being secured in position by a washer 61 and a lockwasher 102 retained by a capscrew 62 received in threaded engagement in an axial bore in the end of the cylindrical extension 54.

The suspension strut assembly 22 is rotatably secured within a cylindrical steering head tube 63 in the snowmobile frame 20 by means of a pair of flanged bearing shells 64 interposed between the opposite ends of the head tube 63 and the external cylindrical surface of the outer strut member 23. The hood 57 is of a size to be received over the steering head tube 63, and is affixed thereto by threaded fasteners (not shown) passing through bores 65 in the lower end of the hood and received in aligned threaded bores 66 in the cylindrical wall of the head tube 63.

The body of the outer strut member 23 is enclosed within a coiled compression spring 67 the opposite ends of which are engaged within an upper fixed spring seat 68 associated with the head tube 63, and a lower movable spring seat 69 associated with the bracket 25.

The arrangement of the bearing shell 64 in the steering head tube 63 enables rotation of the outer tubular member 23 to effect steering movement of the ski 21, this rotation being transmitted from the steering lever 60 through the inner square strut member 24, and the linear bearing assembly 44. The range of angular movement of the steering lever 60 about the axis of the strut assembly is limited, and is controlled by engagement between an abutment 70 on the upper end of the hood 57, and the ends of an angular slot 71 formed in the underside of the tubular hub 59 of the steering lever.

From the foregoing it will be appreciated that telescoping movement of the members 23 and 24 of the suspension strut assembly is resisted by the coil spring 67, and that such movement is dampened by the hydraulic damper 36.

The improved suspension strut assembly disclosed herein combines the suspension and steering functions and provides a smoothness of operation and ride comfort that is improved as compared with prior art systems. The bearings, bushings and other sliding parts such as the L-shaped bearing elements 49 are of suitable low-friction materials such as teflon, or have low-friction coatings to extend their service life. The arrangement of parts is compact, and yet affords a suspension travel of over 6.75 inches. There is one such suspension strut assembly for each ski of the snowmobile, so that where the vehicle includes a single centrally mounted ski, there is only a single suspension strut assembly.

What we claim as our invention is:

1. A ski suspension strut for a snowmobile, comprising:

first and second telescopically arranged members and guide means for guiding said members for a predetermined range of relative axial movement and constraining them against relative rotation;

one end of said first member being adapted to be connected to a snowmobile ski and the second member being adapted for connection to a steering mechanism in said snowmobile to be rotated thereby in effecting steering movement of said ski;

damper means being located interiorly of one said member and operatively connected to both said members to dampen relative axial movement thereof;

wherein said guiding and constraining means comprises linear bearing means mounted in said one member and in sliding engagement with a section of said other member that is of constant non-circular profile over a length that corresponds to said predetermined range;

said one member being of cylindrical profile and being adapted to be rotatably supported in a mounting means in the snowmobile to position said strut in a fixed generally upright orientation, said mounting means including a bearing structure that accommodates axial and rotary movement of said one member therein and that provides additional guidance for relative axial movement of said first and second members.

2. A ski suspension strut assembly according to claim 1, wherein said section of the other member is of constant rectangular profile, said linear bearing means comprising bearing plates supported in said one member and defining in rectangular passage complimentary to said rectangular profile.

3. A ski suspension strut according to claim 2, including a coiled compression spring surrounding said first member and having one end engaged in a seat fixedly supported against said one end of the first member, and its opposite end engaged in a seat supported on an element that is axially fixed with respect to said second member.

4. A ski suspension strut according to claim 1, including a hood enclosing the major portion of said second member and adapted to be fixedly secured in said snowmobile, said second member projecting axially beyond the hood and having a fixed thereto a radially projecting steering lever which is rotatable with said second member, abutment means on said hood defining a limited range of rotation for said steering lever.

5. A snowmobile comprising a snowmobile frame having a forward end that is supported upon at least one steerable ski, said ski being connected to said snowmobile frame by a ski suspension strut that is rotatably supported in the snowmobile frame in a fixed generally upright orientation, said strut comprising a lower tubular telescopic member coupled to said ski, and a coaxial upper telescopic member that is received within said lower member and is guided to move axially but not rotatably with respect to said lower member through a predetermined range or relative axial movement:

mounting means for mounting said upper member rotatably in axially fixed manner in said snowmobile frame;

bearing means in said snowmobile frame receiving said lower strut member in rotatable and axially displaceable fashion; and spring means urging said lower strut member axially away from said upper telescopic member;

damper means located within said tubular lower member, and connected between said upper and lower members to dampen relative axial movements thereof.

6. A ski suspension strut for a snowmobile, comprising:

first and second telescopically arranged members and guide means for guiding said members for a predetermined range of relative axial movement and constraining them against relative rotation;

one end of said first member being adapted to be connected to a snowmobile ski and the second member being adapted for connection to a steering mechanism in said snowmobile to be rotated thereby in effecting steering movement of said ski;

damper means being located interiorly of one said member and operatively connected to both said members to dampen relative axial movement thereof;

wherein said guide means comprises linear bearing means mounted in said one member and in sliding engagement with a section of said other member that is of constant rectangular profile over a length that corresponds to said predetermined range, said linear bearing means comprising bearing plates supported in said one member and defining a rectangular passage complimentary to said rectangular profile; and a coiled compression spring surrounding said first member and having one end engaged in a seat fixedly supported against said one end of the first member, and its opposite end engaged in a seat supported on an element that is axially fixed with respect to said second member.

* * * * *